(12) United States Patent
Fan et al.

(10) Patent No.: US 11,055,374 B2
(45) Date of Patent: Jul. 6, 2021

(54) METHOD AND DEVICE FOR INFORMATION RETRIEVAL, DEVICE AND COMPUTER READABLE STORAGE MEDIUM

(71) Applicant: BAIDU ONLINE NETWORK TECHNOLOGY (BEIJING) CO., LTD., Beijing (CN)

(72) Inventors: Miao Fan, Beijing (CN); Zehao Dou, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 111 days.

(21) Appl. No.: 16/459,913

(22) Filed: Jul. 2, 2019

(65) Prior Publication Data

US 2020/0012697 A1 Jan. 9, 2020

(30) Foreign Application Priority Data

Jul. 3, 2018 (CN) .......................... 201810719076.8

(51) Int. Cl.
*G06F 16/9535* (2019.01)
*G06F 16/2457* (2019.01)
*G06K 9/62* (2006.01)
*G06F 16/9038* (2019.01)

(52) U.S. Cl.
CPC .... *G06F 16/9535* (2019.01); *G06F 16/24578* (2019.01); *G06F 16/9038* (2019.01); *G06K 9/6256* (2013.01)

(58) Field of Classification Search
CPC .................................................. G06F 16/24578
See application file for complete search history.

(56) References Cited

U.S. PATENT DOCUMENTS

2012/0095984 A1* 4/2012 Wren-Hilton ....... G06F 16/9535
707/707

* cited by examiner

*Primary Examiner* — Hau H Hoang
(74) *Attorney, Agent, or Firm* — Fay Sharpe LLP (57) ABSTRACT

The present disclosure provides a method and a device for information retrieval, and a computer readable storage medium. The method includes: determining a plurality of search results associated with user input data, and determining a first relevancy between each of the plurality of search results and the user input data; determining a plurality of target paragraphs associated with the user input data from each of the plurality of search results, and determining a second relevancy between each of the plurality of target paragraphs and the user input data; determining a target text segment associated with the user input data from the plurality of target paragraphs in each of the plurality of search results, and determining a third relevancy between the target text segment and the user input data; and determining an order of the plurality of search results based on the first relevancy, the second relevancy and the third relevancy.

15 Claims, 5 Drawing Sheets

METHOD AND DEVICE FOR INFORMATION RETRIEVAL, DEVICE AND COMPUTER READABLE STORAGE MEDIUM

CROSS-REFERENCE TO RELATED APPLICATIONS

This application claims priority to and benefits of Chinese Patent Application No. 201810719076.8, filed with the National Intellectual Property Administration of P. R. China on Jul. 3, 2018, the entire contents of which are incorporated herein by reference.

TECHNICAL FIELD

Embodiments of the present disclosure relate to information retrieval, and more particularly to, a method and a device for information retrieval, a device and a computer readable storage medium.

BACKGROUND

In most cases, when searching for web information, the user may not want to comprehensively understand all the knowledge related to the input keywords, instead, the user may desire that the search engine can provide short and accurate feedback on the input query. Therefore, there is a need to improve the information retrieval scheme in the related art, to accurately feedback search results for the input query.

SUMMARY

The present disclosure provides a method for information retrieval. The method includes: determining a plurality of search results associated with user input data, and determining a first relevancy between each of the plurality of search results and the user input data; determining a plurality of target paragraphs associated with the user input data from each of the plurality of search results, and determining a second relevancy between each of the plurality of target paragraphs and the user input data; determining a target text segment associated with the user input data from the plurality of target paragraphs in each of the plurality of search results, and determining a third relevancy between the target text segment and the user input data; and determining an order of the plurality of search results based on the first relevancy, the second relevancy and the third relevancy.

The present disclosure provides a device, including: one or more processors, and a memory configured to store one or more programs that, when executed by the one or more processors, causes the one or more processors to implement the method according to embodiments of the present disclosure.

The present disclosure further provides a computer readable storage medium, stored thereon with computer programs that, when executed by a processor, causes the method according to the first aspect of the present disclosure to be implemented.

It should be understood that, the contents described above are not intended to limit the key or important features of embodiments of the present disclosure, and are not intended to limit the scope of the present disclosure. Other features of the present disclosure will be readily appreciated from the following descriptions.

BRIEF DESCRIPTION OF THE DRAWINGS

The above and other features, advantages and aspects of embodiments of the present disclosure will become more apparent from the following descriptions made with reference to the accompanying drawings. In the accompanying drawings, the same or similar numbers in different drawings represent the same or similar elements, in which.

DETAILED DESCRIPTION

Reference will be made in detail to embodiments of the present disclosure with reference to accompany drawings. Although certain embodiments of the present disclosure are shown in the drawings, the present disclosure may be implemented in a variety of forms, and should not be construed as being limited to the embodiments set forth herein, instead, the embodiments are provided to provide a more complete understanding of the present disclosure. It should be understood that, the drawings and embodiments of the present disclosure are for illustrative purposes only and are not intended to limit the scope of the disclosure.

In descriptions of embodiments of the present disclosure, the term "include" and the like should be understood as open inclusion, i.e., "including but not limited to". The term "based on" should be understood as "at least partially based on". The term "an embodiment" or "the embodiment" should be understood as "at least one embodiment". The terms "first", "second", and the like may refer to different or identical objects. Other explicit and implicit definitions may be included below.

In the related art, when searching for webpage information, for example, the information retrieval solution generally retrieves the search results with a high relevancy to the input keywords based on the keywords entered by the user in the search box, and arranges and displays the search results in the decreasing order of the relevancy, and may also highlight the keywords while displaying the search results. The ordering manner of the relevancy is generally determined based on the occurrence frequency of the keywords appearing in each search result. Due to the huge amount of network information, the information retrieval solution in the related art feeds back a large number of search results to the user, the feedback search results are not accurate, and the user needs to browse a lot of information, the browsing efficiency is low.

In the related art, the information retrieval solution may include: obtaining the data (such as query) input by the user in the search box, determining search keywords based on the content of the query, performing retrieval based on the search keywords to obtain a plurality of search results (such as webpages) with a high relevancy to the search keywords, displaying the plurality of search results in the descending order of the importance of the searched webpages and/or in the descending order of the relevancy to the search keywords (such as the frequency of search keywords appearing in search results), and highlighting the search keywords.

In the information retrieval solution described above, on the one hand, since the search results with the relatively high occurrence frequency of search keywords may be directly displayed to the user without being organized, the feedback search results may not be accurate enough, and the user needs to browse a large amount of information. On the other hand, the search results with the high occurrence frequency of keywords may not semantically related to the input query, resulting in that some highly relevant search results are ranked in the lower portion of the display page due to the relatively low occurrence frequency of the search keywords, and are not actually viewed by the user because of the limited browsing time of the user. Therefore, the solution for information retrieval has some deficiencies, the search results fed back for the input query are not accurate enough, the user needs to browse a large amount of non-related information, which is not conducive for the user to find the desired search results efficiently.

In order to solve at least one of the above problems and one or more of the other potential problems, embodiments of the present disclosure provide a solution for information retrieval. The solution includes: determining a plurality of search results associated with user input data, and determining a first relevancy between each of the plurality of search results and the user input data; determining a plurality of target paragraphs associated with the user input data from each of the plurality of search results, and determining a second relevancy between each of the plurality of target paragraphs and the user input data; determining a target text segment associated with the user input data from the plurality of target paragraphs in each of the plurality of search results, and determining a third relevancy between the target text segment and the user input data; and determining an order of the plurality of search results based on the first relevancy, the second relevancy and the third relevancy. The text segment may refer to the continuous text segment.

In the above solution, the first relevancy between each of the plurality of search results and the user input data, the second relevancy between each of the plurality of target paragraphs and the user input data, and the third relevancy between the target text segment and the user input data are comprehensively considered, to determine the display order of the plurality of search results, thereby ensuring that the search result that is highly associated with the whole document, the paragraph and the target text segment can be ranked in front of the display page, and the highly relevant search results can be preferentially viewed by the user, and the user can efficiently find the desired search results.

Figure 1:
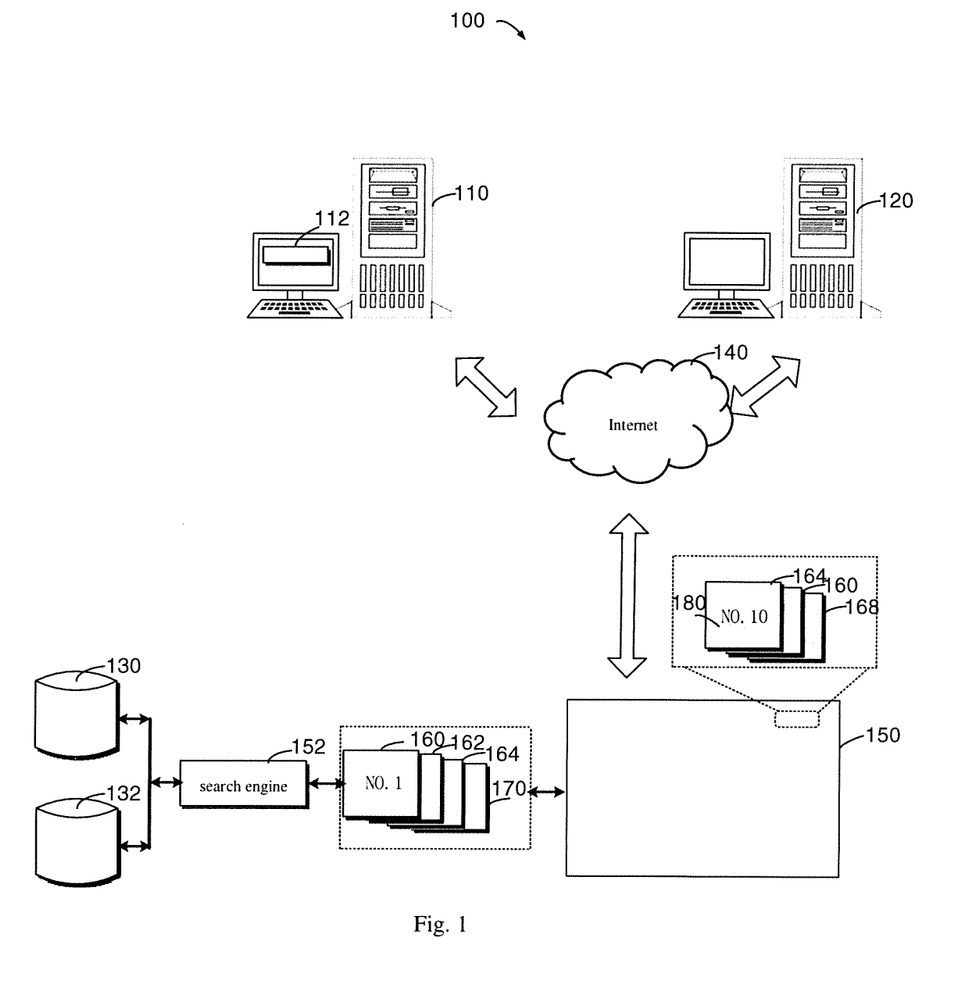
FIG. 1 is a schematic diagram of an environment 100 for implementing an embodiment of the present disclosure.

FIG. 1 is a schematic diagram of a computer network system 100 for implementing the method for information retrieval according to one or more embodiments of the present disclosure. The computer network system 100 includes one or more client computing devices 110 and 120, one or more computing devices 150 for information retrieval, and one or more index repositories 130 and 132. The client computing devices 110 and 120 can perform data interaction with the computing device 150 for information retrieval via network 140.

Each of the client computing device and the computing device 150 for information retrieval may include one or more processing units, including the dedicated processing unit such as GPU (graphic processor unit), FPGA (field programmable gate array) and ASIC (application specific integrated circuit), as well as the general-purpose processing unit such as CPU (central processing unit). In addition, one or more virtual machines can be run on each computing device. In some embodiments, for example, the user can enter the user input data to be retrieved, such as the query Q via the search box 112 rendered by the user interface of the client computing device 110.

In some embodiments, the computing device 150 can obtain the search results associated with the search keywords from the search engine 152. The search results may include, for example, the first search result 160, the $2^{nd}$ search result 162, ..., the $10^{th}$ search result 164, ..., and the $N^{th}$ search result 170. After the search results are obtained, the computing device 150 can determine a plurality of search results associated with the user input data, and a first relevancy between each of the plurality of search results and the user input data. For example, the determined plurality of search results that are associated with the user input data may include the first search result 160, the $10^{th}$ search result 164, and the $20^{th}$ search result 168. The computing device 150 can determine a plurality of target paragraphs associated with the user input data from each of the plurality of the search results, and determine a second relevancy between each of the plurality of target paragraphs and the user input data. Moreover, the computing device 150 may determine the target text segment associated with the user input data from the plurality of target paragraphs in each of the plurality of search results, and determine the third relevancy between the target text segment and the user input data. The computing device 150 may further determine the order of the plurality of search results based on the first relevancy corresponding to the search result, the second relevancy corresponding to the target paragraph, and the third relevancy corresponding to the target text segment. For example, the $10^{th}$ search result 164 may be ranked first, followed by the first search result 160, and then followed by the $20^{th}$ search result 168.

In addition, the computing device 150 can determine the sentence including the target text segment in the search result, and highlight the sentence in the search result. For example, the target text segment 180 in the top ranked $10^{th}$ search result 164 can be highlighted. The sorted plurality of search results including highlighted sentence can be transmitted to the client computing device 110 via network 140, and displayed on the user interface of the client computing device 110. The text segment refers to the continuous text segment.

The index repositories 130 and 132 are configured to store a large amount of organized, classified, indexed retrieval information. In the index repositories 130 and 132, items with search meaning are arranged in an orderly manner for retrieval by the search engine 152. In some embodiments, the index repository 130 may be, for example, the encyclopedia article index repository, and the index repository 132 may be, for example, the book article index repository.

Figure 2:
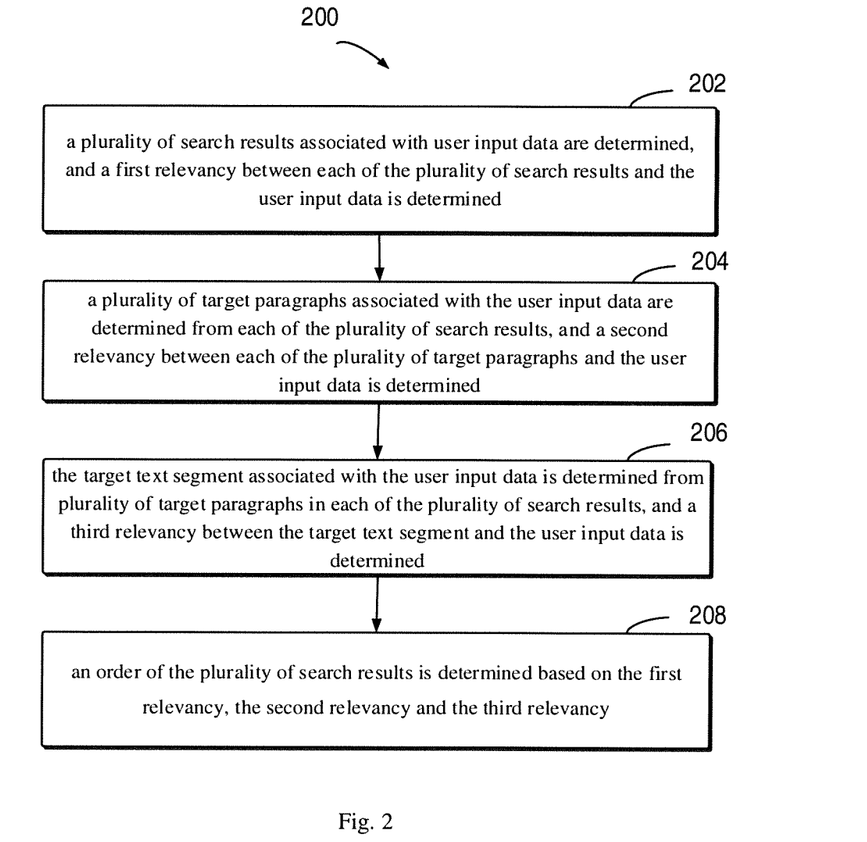
FIG. 2 is a flow chart illustrating a method 200 for information retrieval according to an embodiment of the present disclosure.

FIG. 2 is a flow chart of a method 200 for information retrieval according to an embodiment of the present disclosure. In FIG. 2, the various acts may be performed, for example, by the computing device 150 in computer network system 100 shown in FIG. 1. For convenience of discussion, without loss of generality, the method 200 is described by taking the computer network system 100 shown in FIG. 1 as an example. The method 200 may further include additional acts not shown and/or acts that can be omitted, and the scope of the present disclosure is not limited.

At block 202, a plurality of search results associated with user input data are determined, and a first relevancy between each of the plurality of search results and the user input data is determined.

In some embodiments, the user input data may be, for example, the user query from the client computing device 120, such as the user query Q "how about Baidu's stock today", by extracting the keywords in the query Q, keywords such as Baidu, stock can be obtained. The search results that are highly relevant to the user query Q can be obtained via the search engine 152. For example, via relevancy calculation, the relevancy between the each of the search results and the user query Q can be sorted in the descending order, and a plurality of search results (such as N search results, N is a natural number) that are relevant to the user query Q can be selected, and the relevancy (i.e., the first relevancy) between each of the plurality of search results and the user query Q can be recorded. The length of the search result may be different, and each search result may at least include one paragraph. In some embodiments, the first relevancy may be determined based on the relevancy of each of the plurality of search results and the keywords. The keywords are included in the user input data. For the user query Q "how about Baidu's stock today", the corresponding keywords may be such as Baidu, stock, today.

At block 204, a plurality of target paragraphs associated with the user input data are determined from each of the plurality of search results, and a second relevancy between each of the plurality of target paragraphs and the user input data is determined.

In some embodiments, a plurality of target paragraphs (such as K target paragraphs, K is a natural number) associated with the user input data can be determined from each of the selected N search results, and the corresponding second relevancy can be determined. In some embodiments, the second relevancy between each paragraph in the search result and the user query can be calculated via the manner for calculating the text similarity in the related art. For example, in response to that the second relevancy between the paragraph and the user query Q is greater than a first preset value, the paragraph can be determined as the target paragraph. In some embodiments, the second relevancy corresponding to each paragraph may be sorted from high to low, and a preset number of paragraphs or a preset proportion of paragraphs with the high second relevancy can be selected as the target paragraphs. The first preset value, the preset number or the preset proportion may be set manually according to needs, to determine the number of target paragraphs, i.e., the value of K.

Figure 3:
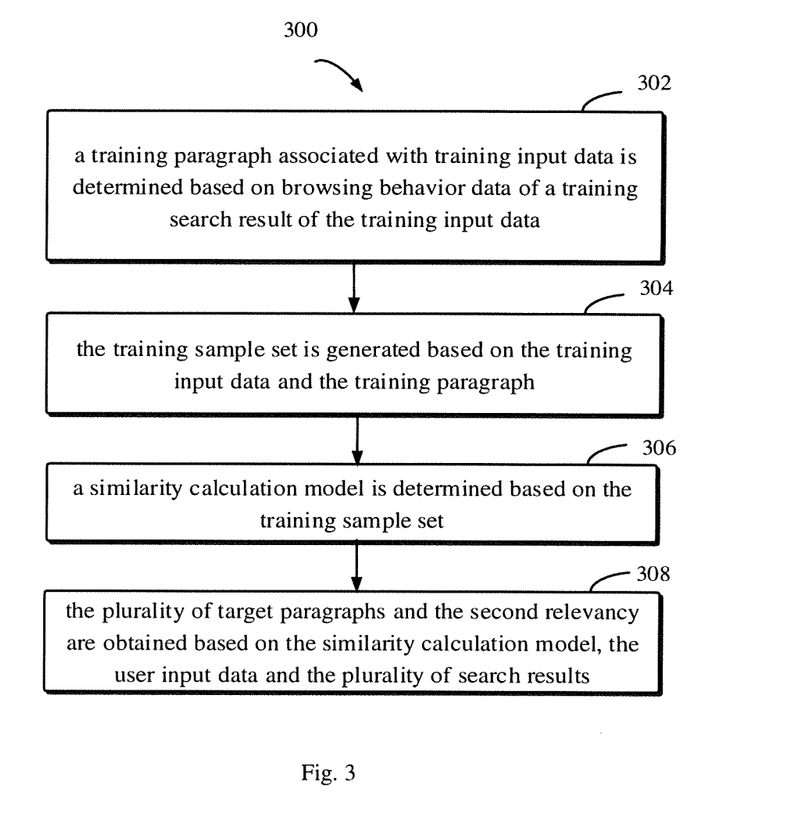
FIG. 3 is a flow chart illustrating a method 300 for calculating a paragraph similarity according to an embodiment of the present disclosure.

In some embodiments, the target paragraph and the second relevancy between the target paragraph and the user input data may be determined based on the trained similarity calculation model. The trained similarity calculation model is different from the text similarity calculation model based on the frequency or density of occurrence of keywords, and the trained similarity calculation model is generated based on the user browsing behavior data of the training feedback search results for the same or similar queries. FIG. 3 is a flow chart illustrating a method 300 for calculating a paragraph similarity according to an embodiment of the present disclosure. In FIG. 3, the various acts may be performed, for example, by the computing device 150 in computer network system 100 shown in FIG. 1. For convenience of discussion, without loss of generality, the process and acts for determining the target paragraph and the second relevancy in the method 200 are described by taking the method 300 for paragraph similarity calculation shown in FIG. 3 as an example.

At block 302, a training paragraph associated with training input data is determined based on browsing behavior data of a training search result of the training input data.

In some embodiments, the training paragraph associated with the training input data in the training search result is determined based on the browsing behavior data of the training search result of the training input data obtained. The training sample set is generated, the training sample set at least includes a plurality of training input data and the training paragraphs associated with the training input data.

In an embodiment, the training input data and the training search result may be from, for example, Chinese corpus DuReader and English corpus MS-MARCO-v2. They both collect a large number of user queries and the corresponding feedback search results in Baidu and Google search engine environment.

For example, for the large number of the user queries and the feedback search results in the above corpus, the browsing behavior data of the search result fed back by the user or the annotator for the user query can be obtained. In some embodiments, the browsing behavior data includes at least one of the number of clicks, a click position, dwell time, a selected content and a copy content for the training search result. For example, the browsing behavior data such as the search result clicked by the user or the annotator, the number of clicks, the click location, the dwell time, and the selected content for the feedback search result can be obtained. Based on the obtained browsing behavior data, potentially relevant paragraphs for the user query can be obtained. For example, the potentially relevant paragraph can be estimated based on the dwell time the user clicks on the search result and the location of the selected content, and the potentially relevant paragraph can be used as the training paragraph associated with training input data for constructing the training sample set. When the user or the annotator actually browses the search result and find the answer corresponding to the query, they pay attention to the keywords included in the user query, and also pay attention to other associated words that are semantically associated with the user query but are not literally mentioned by the user. Thus, the training paragraph determined based on the browsing behavior data can include rich information that is semantically associated with the user query.

At block 304, the training sample set is generated based on the training input data and the training paragraph.

In some embodiments, a large number of user queries (i.e., training input data) and training paragraph determined based on the browsing behavior data can be taken as samples of the training sample set.

At block 306, a similarity calculation model is determined based on the training sample set.

In some embodiments, the similarity calculation model includes a plurality of associated words related to the training input data, and the association probability of each associated word and the training input data. Since the associated word is determined based on the sample set including the training input data and the training paragraphs associated with the training input data, it is equivalent to simulating the user's behavior of browsing and searching for relevant paragraphs for the search results. Therefore, the associated word covers more information that is semantically related to the user query. For example, for the user query Q "how about Baidu's stock today", a plurality of associated words such as price/earnings ratio, closing quotation, stock price, share price rising, closing up, plummeting, per share, trading day can be determined based on the trained similarity calculation model. The keywords in the text similarity calculation model in the related art generally include only the keywords in the user query Q, such as today, Baidu, stock.

At block 308, the plurality of target paragraphs and the second relevancy are obtained based on the similarity calculation model, the user input data and the plurality of search results.

In some embodiments, based on the similarity degree between the user input data and the training input data and the plurality of associated words determined by the trained similarity calculation model, the second relevancy of the paragraph to the associated word can be determined. Then, for example, the second relevancy can be sorted from high to low (i.e., the descending order), such that a plurality of target paragraphs (such as K target paragraphs) that are most relevant to the user query Q can be selected, and the second relevancy corresponding to each of the K target paragraphs can be recorded. For each of the search result in the N search results associated with the user input data, K target paragraphs with high second relevancy with the user input data can be selected, and K*N target paragraphs can be obtained, which can be used as the source of information for answering the user query. For example, for the user query Q "how about Baidu's stock today", the target paragraph, for example, like the text shown in Table 1 below can be constructed based on the method 200.

TABLE 1

"Last night, Baidu's share price finally exceeded the highest point. On the last US stock trading day, Baidu's share price closed up 1.83% to $252.22, hitting a high of $254.28 in intraday trading, surpassing of the peak price of $251.99 since listing. During the past National Day holiday, Baidu is only a little bit away from its peak moment. On October 2, Baidu's share price is $250.57, which is a little lower than the peak price $251.99. The rise did not disappoint, and it finally returned to peak last night."

In the above solution, the target paragraphs in each search result associated with the user input data and the second relevancy are determined based on the similarity calculation model trained by the browsing behavior data, rather than the occurrence frequency of keywords mentioned in the user input data in the target paragraph, the process of determining the target paragraph can simulate the process of the user actually browsing and searching for relevant paragraphs, such that the determination of the target paragraph and the second relevancy is accurate, the limitation of using the keywords in the user query to calculate similarity can be avoided, thereby improving the accuracy of feedback search results.

At block 206, the target text segment associated with the user input data is determined from plurality of target paragraphs in each of the plurality of search results, and a third relevancy between the target text segment and the user input data is determined.

Generally, the determination of the target text segment may require the machine to scan and compute the text to be analyzed, which can consume a large amount of computing resources of the processor. Since the method 200 only needs to scan the selected K*N target paragraphs, rather than scan the entire text of each search result, thus the computing resources of the processor can be significantly saved, and the processing speed for determining the target text segment and the third relevancy can be improved.

In some embodiments, a target text segment associated with the user input data and the corresponding third relevancy are determined in the K target paragraphs in each search result. The third relevancy, for example, refers to the relevancy between the determined target text segment and the user query. In the above solution, N search results associated with the user query are selected from the plurality of search results, K target paragraphs are selected in each of the N search results, and a target text segment most relevant to the user query is selected from the K target paragraphs in each of the selected N search results, and then the selected N target text segments can be used as the answer to the user query Q in the N search results.

By the above means, the accuracy and efficiency of the feedback search result can be improved, and user's viewing of irrelevant information can be significantly reduced. By comparing the method for displaying the feedback search results according to the importance of the webpage and/or the occurrence frequency of search keywords, the method 200 can significantly increase the number of relevant search results included in the feedback webpage for each user query. With the technical solution, even for some users who has limited time to browse the web, better search results may not be missed and can be browsed by the user.

Figure 4:
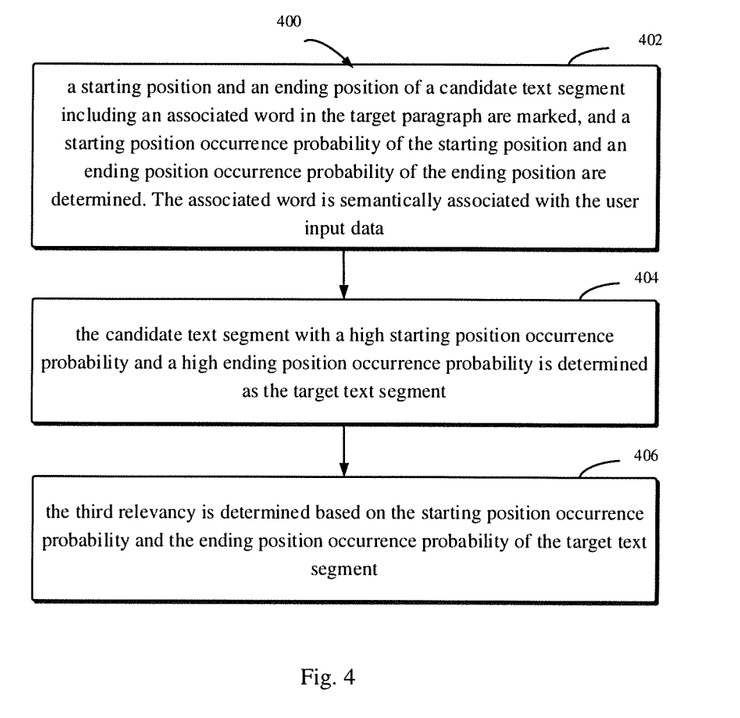
FIG. 4 is a flow chart illustrating a method 400 for calculating a similarity of a target text segment according to an embodiment of the present disclosure.

In some embodiments, the target text segment and the third relevancy may be determined by the method 400 for relevancy calculation of the target text segment. FIG. 4 is a flow chart illustrating a method 400 for calculating a similarity of a target text segment according to an embodiment of the present disclosure. In FIG. 4, the various acts may be performed, for example, by the computing device 150 in computer network system 100 shown in FIG. 1. For convenience of discussion, without loss of generality, the process and acts for determining the target text segment (i.e., the continuous target text segment) and the third relevancy in the method 200 are described by taking the method 400 for similarity calculation of the target text segment shown in FIG. 4 as an example.

At block 402, a starting position and an ending position of a candidate text segment including an associated word in the target paragraph are marked, and a starting position occurrence probability of the starting position and an ending position occurrence probability of the ending position are determined. The associated word is semantically associated with the user input data.

In some embodiments, the target text segment and the third relevancy may be determined based on the trained machine reading comprehension model. For example, the associated word can be determined based on a similarity degree of the user input data and the training input data and an association probability, the association probability represents an association degree of the associated word and the training input data, the length of the candidate text segment including the associated word can be determined, and the starting position and the ending position can be determined based on the length. For example, in response to determining that the length of the candidate text segment is 4 words, the starting position and the ending position of the text segment including the associated word having the length of 4 words can be marked in the target paragraph, and the starting position occurrence probability of the starting position and the ending position occurrence probability of the ending position can be determined. In some embodiments, the associated word may be, for example, the plurality of associated words included in the similarity calculation model trained by the browsing behavior data mentioned above. In some embodiments, the starting position occurrence probability may be adjusted according to the number of occurrences of the starting position, and the ending position occurrence probability may be adjusted according to the number of occurrences of the end position.

At block 404, the candidate text segment with a high starting position occurrence probability and a high ending position occurrence probability is determined as the target text segment.

In some embodiments, in response to that the starting position occurrence probability and the ending position occurrence probability being greater than a second preset value, the text segment between the starting position and the ending position can be determined as the target text segment.

At block 406, the third relevancy is determined based on the starting position occurrence probability and the ending position occurrence probability of the target text segment.

In some embodiments, the product or the weighted sum of the starting position occurrence probability and the ending position occurrence probability of the target text segment may be determined as the third relevancy.

By the above means, for each of the N search results associated with the user input data, a target text segment most related to the user query Q may be selected, thus N target text segments can be obtained, and the N target text segments may be used in the answer portion for user query Q of the N search results. For example, for the user query Q "how about Baidu's stock today", two target text segments, for example, like the text segments shown in FIG. 2 below may be selected as the search result for the user query.

TABLE 2

"Last US stock trading day";
"Baidu's share price closed up
1.83% to $252.22, hitting a high
of $254.28 in intraday trading".

At block 208, an order of the plurality of search results is determined based on the first relevancy, the second relevancy and the third relevancy.

The order is configured to arrange the plurality of search results when they are presented. In some embodiments, based on the first relevancy between each of the plurality of the search results and the user query, the second relevancy between each of the plurality of the target paragraphs and the user query, and the third relevancy between the target text segment and the user query, the comprehensive relevancy corresponding to each of the plurality of search results associated with each user input data can be determined. Then, the plurality of search results may be sorted based on the comprehensive relevancy in the descending order, and the sorted plurality of search results can be displayed. In some embodiments, the comprehensive relevancy may be determined based on the product of the first relevancy, the second relevancy and the third relevancy of each search result. For example, for the two search results fed back to the user as the answer to the user query Q "how about Baidu's stock today", the comprehensive relevancy corresponding to the target text segment "Baidu's share price closed up 1.83% to $252.22, hitting a high of $254.28 in intraday trading" is greater than that corresponding to the target text segment "Last US stock trading day", thus when the plurality of search results are presented, the search result of the target text segment "Baidu's share price closed up 1.83% to $252.22, hitting a high of $254.28 in intraday trading" may be ranked at the front position of the feedback page displayed.

With the method 200 for information retrieval, by ranking the highly relevant search result in the whole document, the paragraph and the target text segment in the front position of the display page of the feedback search results, the highly relevant search results may be preferentially viewed by the user, and the efficiency of the user finding the desired search results can be improved. In order to test the technical effects of the method 200 for information retrieval, for the same user query, the feedback search results of the method for information retrieval in the related art and the feedback search results of the method 200 can be displayed side by side on the left and right sides of the user interface, based on the test result, it shows that more than 70% of testers select to browse the feedback search results of the method 200.

In order to accurately feed back of the search results, in some embodiments, the sentence including the target text segment in each search result may be determined, and the sentence including the target text segment can be highlighted in each search result displayed. Since the sentence including the target text segment associated with the user query is highlighted, the user can quickly and easily browse to the semantically coherent expression closely associated with the input query, making the feedback search results more accurate.

For example, in the method 200, the sentence including the target text segment in each search result can be determined, and the determined sentence can be highlighted. In general, the target text segment may be short, for example, the target text segment may include 4 words, and may not be semantically complete and coherent. Thus, the sentence including the target text segment may be determined by scanning the closet punctuation marks (such as periods) before and after the target text segment, and the determined sentence can be highlighted, the user can quickly browse the semantically coherent expression most closely related to the input query, thus effectively improving the user experience.

Figure 5:
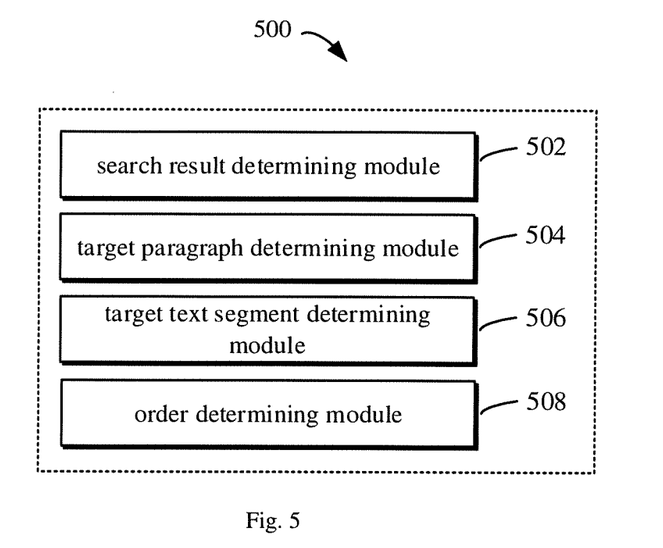
FIG. 5 is a block diagram illustrating a device 500 for information retrieval according to an embodiment of the present disclosure.

FIG. 5 is a block diagram illustrating a device 500 for information retrieval according to an embodiment of the present disclosure. As shown in FIG. 5, the device 500 includes a search result determining module 502, a target paragraph determining module 504, a target text segment determining module 506, and an order determining module 508. The search result determining module 502 is configured to determine a plurality of search results associated with user input data, and determine a first relevancy between each of the plurality of search results and the user input data. The target paragraph determining module 504 is configured to determine a plurality of target paragraphs associated with the user input data from each of the plurality of search results, and determine a second relevancy between each of the plurality of target paragraphs and the user input data. The target text segment determining module 506 is configured to determine a target text segment associated with the user input data from the plurality of target paragraphs in each of the plurality of search results, and determine a third relevancy between the target text segment and the user input data. The order determining module 508 is configured to determine an order of the plurality of search results based on the first relevancy, the second relevancy and the third relevancy.

In some embodiments, the search result determining module includes a first relevancy determining unit. The first relevancy determining unit is configured to determine keywords in the user input data, and determine the first relevancy based on a relevancy of each of the plurality of search results and the keywords.

In some embodiments, the target paragraph determining module includes a training paragraph determining unit, a training sample set generating unit, a model determining unit, and a second relevancy determining unit. The training paragraph determining unit is configured to determine a training paragraph associated with training input data based on browsing behavior data of a training search result of the training input data. The training sample set generating unit is configured to generate a training sample set based on the training input data and the training paragraph. The model determining unit is configured to determine a similarity calculation model based on the training sample set. The second relevancy determining unit is configured to obtain the plurality of target paragraphs and the second relevancy based on the similarity calculation model, the user input data, and the plurality of search results.

In some embodiments, the browsing behavior data includes at least one of the number of clicks, a click position, dwell time and a copy content for the training search result.

In some embodiments, the target text segment determining module includes a position determining unit, a probability determining unit, and a third relevancy determining unit. The position determining unit is configured to mark a starting position and an ending position of a candidate text segment including an associated word in the target paragraph, and determine a starting position occurrence probability of the starting position and an ending position occurrence probability of the ending position. The associated word is semantically associated with the user input data. The probability determining unit is configured to determine the candidate text segment with a high starting position occurrence probability and a high ending position occurrence probability as the target text segment. The third relevancy determining unit is configured to determine the third relevancy based on the starting position occurrence probability and the ending position occurrence probability of the target text segment.

In some embodiments, the position determining module includes an associated word determining unit, a length determining unit, a starting position and ending position determining unit. The associated word determining unit is configured to determine the associated word based on a similarity degree of the user input data and the training input data and an association probability. The association probability represents an association degree of the associated word and the training input data. The length determining unit is configured to determine a length of the candidate text segment including the associated word. The starting position and ending position determining unit is configured to determine the starting position and the ending position based on the length.

In some embodiments, the order determining module includes a comprehensive relevancy determining unit and a relevancy sorting unit. The comprehensive relevancy determining unit is configured to determine a comprehensive relevancy corresponding to each of the plurality of search results based on the first relevancy, the second relevancy and the third relevancy. The relevancy sorting unit is configured to sort the plurality of search results based on the comprehensive relevancy in a descending order.

In some embodiments, the device 500 further includes a sentence determining module and a highlighting module. The sentence determining module is configured to determine a sentence including the target text segment in each of the plurality of search results. The highlighting module is configured to highlight the sentence in the search result.

Figure 6:
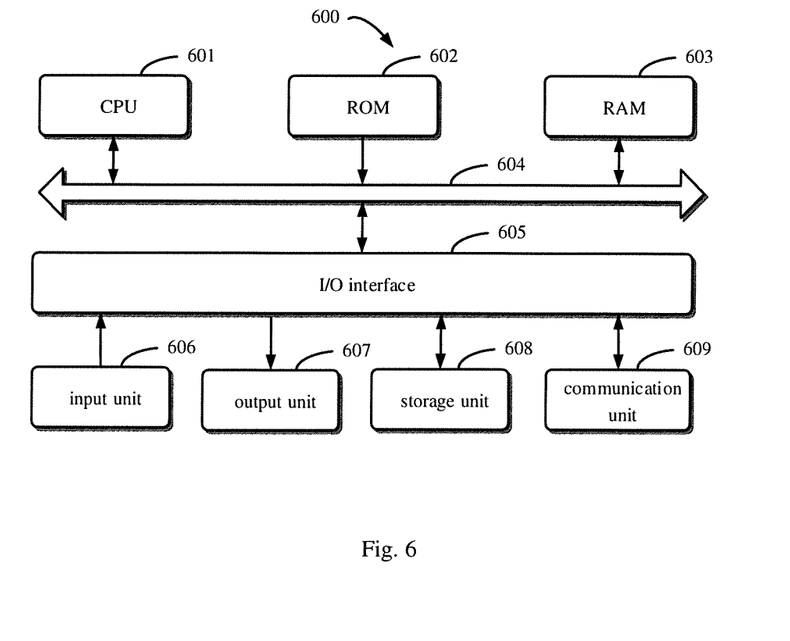
FIG. 6 is a block diagram of a device 600 for implementing an embodiment of the present disclosure.

FIG. 6 is a block diagram illustrating a device 600 for implementing an embodiment of the present disclosure. The device 600 can be configured to implement the computing device 150 shown in FIG. 1. As shown in FIG. 6, the device 600 includes a central processing unit (CPU) 601, which can perform various operations and processes according to computer program instructions stored in the read-only memory (ROM) 602 or the computer program instructions loaded from the storage unit 608 into the random-access memory (RAM) 603. The RAM 603 may store various programs and data required for operation of the device 600. The CPU 601, the ROM 602 and RAM 603 may be connected to each other via the bus 604. The input/output (I/O) interface 605 may also be connected to the bus 604.

A plurality of components in the device 600 may be connected to the I/O interface 605, including: an input unit 606 such as the keyboard, the mouse, and the like; an output unit 607, such as various types of displays, speakers, and the like; a storage unit 608, such as the disk, the optical disk, and the like; and a communication unit 609, such as a network card, a modem, a wireless communication transceiver, and the like. The communication unit 609 allows the device 600 to exchange information/data with other devices via computer networks such as the Internet and/or various telecommunications networks.

The processing unit 601 can perform the various methods and processes described above, such as the method 200, 300, and 400. For example, in some embodiments, the method 200, 300, and 400 may be implemented as computer software programs that are tangibly included in the machine readable medium, such as the storage unit 608. In some embodiments, part or all the computer programs may be loaded and/or installed on the device 600 via the ROM 602 and/or the communication unit 609. When the computer program is loaded into the RAM 603 and executed by the CPU 601, one or more steps of the method 200, 300, and 400 described above can be performed. Alternatively, in other embodiments, the CPU 601 may be configured as the method 200, 300, and 400 by any other suitable means (for example, by means of firmware).

The functions described above may be performed at least in part by one or more hardware logic components. For example, without limitation, exemplary types of hardware logic components may include: the field programmable gate array (FPGA), the application specific integrated circuit (ASIC), the application specific standard product (ASSP), the system on chip (SOC), the complex programmable logic device (CPLD), and the like.

The program codes for carrying out operations of embodiments of the present disclosure may be written in any combination of one or more programming languages. The program codes may be provided to processor or the controller of a general-purpose computer, a special purpose computer, or other programmable data-processing devices, such that when executed by the processor or controller, causes the functions/operations specified in the flowchart and/or the block diagram to be implemented. The program codes may be executed entirely on the machine, partially on the machine, as a separate software package, partially on the remote machine, or entirely on the remote machine or server.

In the context of the present disclosure, the machine-readable medium may be a tangible medium that may include or store programs that can be used by or in conjunction with the instruction execution system, apparatus, or device. The machine-readable medium may be the machine-readable signal medium or the machine-readable storage medium. The machine-readable medium may include, but is not limited to, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof.

In addition, although acts or steps are described in the particular order, it should be understood that, such acts or steps that are required to be performed in the particular or sequence order shown, or that all illustrated acts or steps should be performed to achieve the desired results. Multi-tasking and parallel processing may be advantageous under certain circumstances. Similarly, although some implementation details are described above, these should not be construed as limiting the scope of the present disclosure. Certain features described in the context of the separate embodiment may also be implemented in combination in the single implementation. Instead, the various features described in the context of the single implementation may also be implemented in a plurality of implementations, either individually or in any suitable sub-combination.

Although embodiments of the present disclosure have been described in language specific to structural features and/or methodological acts, it should be understood that, the subject matter defined in the appended claims is not limited to the features or acts described above. Instead, the specific features and acts described above are merely exemplary forms of implementing the claims.

What is claimed is:

1. A method for information retrieval, comprising:
   determining a plurality of search results associated with user input data, and determining a first relevancy between each of the plurality of search results and the user input data;
   determining a plurality of target paragraphs associated with the user input data from each of the plurality of search results, and determining a second relevancy between each of the plurality of target paragraphs and the user input data;
   determining a target text segment associated with the user input data from the plurality of target paragraphs in each of the plurality of search results, and determining a third relevancy between the target text segment and the user input data; and
   determining an order of the plurality of search results based on the first relevancy, the second relevancy and the third relevancy;
   wherein determining the plurality of target paragraphs and the second relevancy comprises:
   determining a training paragraph associated with training input data based on browsing behavior data of a training search result of the training input data;
   generating a training sample set based on the training input data and the training paragraph;
   determining a similarity calculation model based on the training sample set; and
   applying the user input data and the plurality of search results to the similarity calculation model to obtain the plurality of target paragraphs and the second relevancy.

2. The method according to claim 1, wherein determining the plurality of search results and the first relevancy comprises:
   determining keywords in the user input data; and
   determining the first relevancy based on a relevancy of each of the plurality of search results and the keywords.

3. The method according to claim 1, wherein the browsing behavior data comprises at least one of: a number of clicks, a click position, dwell time and a copy content for the training search result.

4. The method according to claim 1, wherein determining the target text segment and the third relevancy comprises:
   marking a starting position and an ending position of a candidate text segment comprising an associated word in the target paragraph, the associated word being semantically associated with the user input data;
   determining a starting position occurrence probability of the starting position and an ending position occurrence probability of the ending position;
   determining the candidate text segment having a high starting position occurrence probability and a high ending position occurrence probability as the target text segment; and
   determining the third relevancy based on the starting position occurrence probability and the ending position occurrence probability of the target text segment.

5. The method according to claim 4, wherein marking the starting position and the ending position of the candidate text segment comprises:
   determining the associated word based on a similarity degree of the user input data and the training input data and an association probability, the association probability representing an association degree of the associated word and the training input data;
   determining a length of the candidate text segment comprising the associated word; and
   determining the starting position and the ending position based on the length.

6. The method according to claim 1, wherein determining the order of the plurality of search results comprises:
   determining a comprehensive relevancy corresponding to each of the plurality of search results based on the first relevancy, the second relevancy and the third relevancy; and
   sorting the plurality of search results based on the comprehensive relevancy in a descending order.

7. The method according to claim 1, further comprising:
   determining a sentence comprising the target text segment in each of the plurality of search results; and highlighting the sentence.

8. A device for information retrieval, comprising:
   one or more processors; and
   a memory, configured to store one or more programs;
   wherein when the one or more programs are executed by the one or more processors, causes the one or more processors to:
   determine a plurality of search results associated with user input data, and determine a first relevancy between each of the plurality of search results and the user input data;
   determine a plurality of target paragraphs associated with the user input data from each of the plurality of search results, and determine a second relevancy between each of the plurality of target paragraphs and the user input data;
   determine a target text segment associated with the user input data from the plurality of target paragraphs in each of the plurality of search results, and determine a third relevancy between the target text segment and the user input data; and determine an order of the plurality of search results based on the first relevancy, the second relevancy and the third relevancy;

wherein the one or more processors are further configured to:

determine a training paragraph associated with training input data based on browsing behavior data of a training search result of the training input data;

generate a training sample set based on the training input data and the training paragraph;

determine a similarity calculation model based on the training sample set; and apply the user input data and the plurality of search results to the similarity calculation model to obtain the plurality of target paragraphs and the second relevancy.

9. The device according to claim 8, wherein the one or more processors are further configured to:

determine keywords in the user input data, and determine the first relevancy based on a relevancy of each of the plurality of search results and the keywords.

10. The device according to claim 8, wherein the browsing behavior data comprises at least one of: a number of clicks, a click position, dwell time and a copy content for the training search result.

11. The device according to claim 8, wherein the one or more processors are further configured to:

mark a starting position and an ending position of a candidate text segment comprising an associated word in the target paragraph, and determine a starting position occurrence probability of the starting position and an ending position occurrence probability of the ending position, the associated word being semantically associated with the user input data;

determine the candidate text segment having a high starting position occurrence probability and a high ending position occurrence probability as the target text segment; and determine the third relevancy based on the starting position occurrence probability and the ending position occurrence probability of the target text segment.

12. The device according to claim 11, wherein the one or more processors are further configured to:

determine the associated word based on a similarity degree of the user input data and the training input data and an association probability, the association probability representing an association degree of the associated word and the training input data;

determine a length of the candidate text segment comprising the associated word; and determine the starting position and the ending position based on the length.

13. The device according to claim 8, wherein the one or more processors are further configured to:

determine a comprehensive relevancy corresponding to each of the plurality of search results based on the first relevancy, the second relevancy and the third relevancy; and sort the plurality of search results based on the comprehensive relevancy in a descending order.

14. The device according to claim 8, wherein the one or more processors are further configured to:

determine a sentence comprising the target text segment in each of the plurality of search results; and highlight the sentence.

15. A non-transitory computer readable storage medium, stored thereon with computer programs that, when executed by a processor, causes a method for information retrieval to be implemented, the method comprising:

determining a plurality of search results associated with user input data, and determining a first relevancy between each of the plurality of search results and the user input data;

determining a plurality of target paragraphs associated with the user input data from each of the plurality of search results, and determining a second relevancy between each of the plurality of target paragraphs and the user input data;

determining a target text segment associated with the user input data from the plurality of target paragraphs in each of the plurality of search results, and determining a third relevancy between the target text segment and the user input data; and determining an order of the plurality of search results based on the first relevancy, the second relevancy and the third relevancy;

wherein determining the plurality of target paragraphs and the second relevancy comprises:

determining a training paragraph associated with training input data based on browsing behavior data of a training search result of the training input data;

generating a training sample set based on the training input data and the training paragraph;

determining a similarity calculation model based on the training sample set; and applying the user input data and the plurality of search results to the similarity calculation model to obtain the plurality of target paragraphs and the second relevancy.

\* \* \* \* \*